United States Patent
Rimboeck et al.

(10) Patent No.: US 11,198,613 B2
(45) Date of Patent: Dec. 14, 2021

(54) PROCESS FOR PRODUCING CHLOROSILANES USING A CATALYST SELECTED FROM THE GROUP OF CO, MO, W

(71) Applicant: WACKER CHEMIE AG, Munich (DE)

(72) Inventors: Karl-Heinz Rimboeck, Heldenstein (DE); Uwe Paetzold, Burghausen (DE); Marek Sobota, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 16/753,935

(22) PCT Filed: Oct. 5, 2017

(86) PCT No.: PCT/EP2017/075421
§ 371 (c)(1),
(2) Date: Apr. 6, 2020

(87) PCT Pub. No.: WO2019/068336
PCT Pub. Date: Apr. 11, 2019

(65) Prior Publication Data
US 2020/0325027 A1 Oct. 15, 2020

(51) Int. Cl.
*C01B 33/107* (2006.01)
*B01J 23/888* (2006.01)

(52) U.S. Cl.
CPC ..... *C01B 33/10742* (2013.01); *B01J 23/8885* (2013.01)

(58) Field of Classification Search
CPC ... C01B 33/10742; B01J 23/24; B01J 23/888; B01J 23/8885
See application file for complete search history.

(56) References Cited

U.S. PATENT DOCUMENTS

| 4,092,446 A | 5/1978 | Padovani et al. |
|---|---|---|
| 4,224,297 A * | 9/1980 | Straussberger ... C01B 33/10742 423/348 |
| 5,871,705 A | 2/1999 | Sakata et al. |
| 2005/0226803 A1 | 10/2005 | Pflugler et al. |
| 2012/0189501 A1 * | 7/2012 | Gupta .................. C01B 33/03 422/139 |
| 2012/0301385 A1 | 11/2012 | Akiyoshi et al. |
| 2014/0050648 A1 | 2/2014 | Becker et al. |
| 2014/0212352 A1 | 7/2014 | Onal et al. |
| 2018/0265367 A1 * | 9/2018 | Kleiber ................ B01J 23/755 |

FOREIGN PATENT DOCUMENTS

| CN | 102753478 A | 10/2012 |
|---|---|---|
| DE | 102014007354 A1 | 11/2015 |
| EP | 1586537 B1 | 1/2010 |
| WO | 2009029791 A1 | 3/2009 |
| WO | 2012065892 A1 | 5/2012 |
| WO | 2012123159 A1 | 9/2012 |
| WO | 2015177052 A1 | 11/2015 |
| WO | 2016198264 A1 | 12/2016 |

* cited by examiner

Primary Examiner — Ngoc-Yen Nguyen
(74) Attorney, Agent, or Firm — Brooks Kushman P.C.

(57) ABSTRACT

Generally unusable or difficultly useable dusts of ultrahigh purity silicon can be used to produce chlorosilanes under reasonable reaction conditions by employing a catalyst containing one or more of Co, Mo, W. The process may be incorporated into an integral plant for the production of polycrystalline silicon.

19 Claims, 1 Drawing Sheet

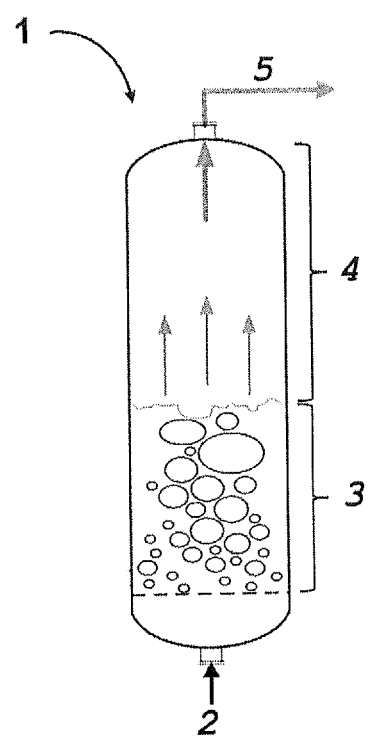

PROCESS FOR PRODUCING CHLOROSILANES USING A CATALYST SELECTED FROM THE GROUP OF CO, MO, W

CROSS REFERENCE TO RELATED APPLICATIONS

This application is the U.S. National Phase of PCT Appln. No. PCT/EP2017/075421 filed Oct. 5, 2017, the disclosure of which is incorporated in its entirety by reference herein.

BACKGROUND OF THE INVENTION

1. Field of the Invention

The invention relates to a process for producing chlorosilanes in a fluidized bed reactor by reaction of a hydrogen chloride-containing reaction gas with a particulate contact mass containing ultrahigh purity silicon and a catalyst, wherein the catalyst comprises at least one element from the group comprising Co, Mo and W and wherein the chlorosilanes have the general formula $H_nSiCl_{4-n}$ and/or $H_mCl_{6-m}Si_2$ where n=1-4 and m=0-4.

2. Description of the Related Art

The production of polycrystalline silicon as a starting material for the manufacture of chips or solar cells is typically carried out by decomposition of volatile halogen compounds thereof, in particular chlorosilanes such as trichlorosilane (TCS, $HSiCl_3$). In order to meet the requirements for the manufacture of chips or solar cells the polycrystalline silicon must at least have a purity of more than 99.9%. Silicon having a purity of >99% is referred to as ultrahigh purity silicon.

Polycrystalline silicon of such purity may be produced in the form of rods by the Siemens process, wherein polycrystalline silicon is deposited on heated filament rods in a reactor. The process gas employed is typically a mixture of TCS and hydrogen. Alternatively, polycrystalline silicon granulate may be produced in a fluidized bed reactor. Silicon particles are fluidized in a fluidized bed by means of a gas flow, wherein the gas is heated to high temperatures via a heating apparatus. Addition of a silicon-containing reaction gas such as TCS brings about a pyrolysis reaction at the hot particle surface, thus causing the particles to increase in diameter.

The polycrystalline silicon serves as starting material in the production of multicrystalline silicon, for example by the block casting process. The multicrystalline silicon obtained in the form of a block typically has a higher purity than polycrystalline silicon and may be used for manufacturing solar cells. To this end the silicon blocks are generally sawn into rectangular wafers.

Polycrystalline silicon further serves as starting material in the production of single-crystal silicon, for example according to the zone melting or Czochralski process. These afford rod-shaped silicon single crystals (ingots) which are sawn into round wafers.

The deposition of polycrystalline silicon in fluidized bed or Siemens reactors produces not only the target product (silicon granulate/silicon rods) but also silicon dust as a byproduct whose purity is typically equal to the purity of the target product. Furthermore, silicon dust is also produced in the mechanical processing (crushing, milling) of the silicon rods, silicon blocks and ingots.

These ultrahigh purity silicon dusts (purity>99.9%) have hitherto either been disposed of or, together with metallurgical silicon (mgSi) which typically has a purity of <99.9%, used for producing chlorosilanes.

The production of chlorosilanes, in particular TCS, may be carried out essentially by three processes based on the following reactions (cf. WO2016/198264A1):

$$Si+3HCl \rightarrow SiHCl_3+H_2+byproducts \quad (1)$$

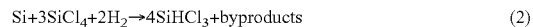

$$Si+3SiCl_4+2H_2 \rightarrow 4SiHCl_3+byproducts \quad (2)$$

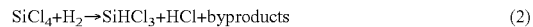

$$SiCl_4+H_2 \rightarrow SiHCl_3+HCl+byproducts \quad (2)$$

Byproducts that may be generated include further halosilanes, for example monochlorosilane ($H_3SiCl$), dichlorosilane ($H_2SiCl_2$), silicon tetrachloride (STC, $SiCl_4$) and di- and oligosilanes. Impurities such as hydrocarbons, organochlorosilanes and metal chlorides may likewise be constituents of the byproducts. To produce high-purity TCS a distillation typically follows.

In the hydrochlorination according to reaction (1) chlorosilanes are produced in a fluidized bed reactor from mgSi by addition of hydrogen chloride (HCl). Such a process is described for example in U.S. Pat. No. 4,092,446.

EP 1 586 537 A1 further discloses a hydrochlorination process for producing TCS where silicon dust having a maximum grain size of 80 μm which is generated in the comminution of mgSi is introduced directly into a fluidized bed reactor.

It is apparent from WO 2012/065892 A1 that silicon dust generated in the mechanical processing of ultrahigh purity silicon (purity at least 99.99%) or in the production thereof cannot be converted into chlorosilanes by hydrochlorination in a fluidized bed reactor at 380° C. Chlorosilanes were obtained in the fluidized bed process in a poor yield of 15% at a temperature of 750° C. Only by using a fixed bed composed of a dumped bed of mgSi (150 to 250 μm) and by introducing the ultrahigh purity silicon milled to a particle size of <50 μm below the fixed bed was the yield of chlorosilanes enhanced.

It is disadvantageous that an additional milling step increases the costs of the process. In addition the relatively high temperatures at which known processes occur place higher demands on the material of the reactor plants. The generation of these temperatures also entails elevated energy requirements. For example it may even be necessary to preheat the feed conduits for the reactants. The high temperatures altogether bring about high costs and an elevated vulnerability to failures. Fixed bed reactors are also to be provided in addition to the fluidized bed reactors in any case present for the production of chlorosilanes, thus adding further costs to the recovery of the ultrahigh purity silicon dust. It may also be necessary to procure additional mgSi for the recovery of the ultrahigh purity silicon dust.

SUMMARY OF THE INVENTION

The present invention accordingly has for its object to provide a process allowing direct conversion of dusts composed of ultrahigh purity silicon without exhibiting the disadvantages known from the prior art. This object is achieved by a process for producing chlorosilanes in a fluidized bed reactor by reaction of a hydrogen chloride-containing reaction gas with a particulate contact mass containing ultrahigh purity silicon and a catalyst, wherein the catalyst comprises at least one element from the group comprising Co, Mo and W. The chlorosilanes have the general formula $H_nSiCl_{4-n}$ and/or $H_mCl_{6-m}Si_2$ where n=1-4 and m=0-4. In a preferred embodiment the catalyst further comprises at least one element from the group comprising Zn, Cr and Ni.

BRIEF DESCRIPTION OF THE DRAWING

FIG. 1 illustrates a fluidized bed reactor for performing the process of the invention.

DETAILED DESCRIPTION OF THE PREFERRED EMBODIMENTS

It has now been found that, surprisingly, even dusts composed of ultrahigh purity silicon (purity>99.9%) are even convertible into chlorosilanes, in particular TCS, in a fluidized bed reactor in the presence of small amounts of the elements cobalt, molybdenum, tungsten and mixtures thereof by hydrochlorination under typical reaction conditions (for example at a temperature of <380° C. and an absolute pressure between 0.2 and 0.5 MPa such as described in EP 1 586 537 A1, for example). A common conversion with mgSi is not necessary. In some cases, chlorosilane selectivity was increased further by additions of at least one of the elements zinc, chromium and nickel.

The contact mass containing the ultrahigh purity silicon and the catalyst may be employed directly in existing fluidized bed reactors. Conversion to fixed bed reactors is not necessary. Chlorosilane selectivities and conversions of HCl comparable with the results obtained in the hydrochlorination of mgSi are moreover particularly advantageously achieved.

The direct recovery of the ultrahigh purity silicon dusts generated as a byproduct provides a great economic advantage. In particular, so-called reprocessing costs such as melting or mixing the ultrahigh purity silicon dust with mgSi are avoided. Costs for disposal of the ultrahigh purity silicon dusts are likewise avoided. The procurement of mgSi can also be reduced.

The catalyst is preferably present in the contact mass in a proportion of 1 to 900 ppmw, more preferably 10 to 700 ppmw, and most preferably 100 to 400 ppmw, based on the weight of the contact mass.

The catalyst is preferably present in the contact mass in metallic, oxidic, carbidic, alloyed and/or salt-like form. Mixtures of the recited forms are also conceivable. It is particularly preferable when the catalyst is in the form of a carbide and/or chloride of the respective element. The catalyst may also be in the form of a silicide.

The contact mass is preferably composed of particulate ultrahigh purity silicon (dust) and the catalyst. The composition of the ultrahigh purity silicon dust/of the contact mass may be determined by x-ray fluorescence analysis (XFA).

In a preferred embodiment the contact mass is a byproduct generated in the deposition of polycrystalline silicon by the Siemens or granulate process. It may also be a byproduct generated in the mechanical processing of polycrystalline/ multicrystalline or single-crystal silicon. The mechanical processing is in particular crushing and/or milling. If the contact mass is such a byproduct, purification prior to hydrochlorination is in principle not necessary. The ultrahigh purity silicon dust may be converted directly. Costly and complex purification steps are no longer required. Less preferred in principle is the use of silicon dusts generated as byproducts in sawing processes since these are generally severely contaminated as is described for example in DE 10 2014 007 354 A1.

However, in some cases it may be preferable for the process according to the invention to be preceded by a purification of the contact mass.

The catalyst may in particular be a constituent of an abraded material from comminution equipment such as hammers, roller mills, jaw crushers or chisels. It may further be a constituent of an abraded material of plant parts and/or pipelines. An abraded material in the case of plant parts may arise for example as a result of pneumatic conveying of the typically sharp-edged silicon dust. The catalyst may thus be present in the ultrahigh purity silicon dust in the form of foreign particles. It is customary for example for jaw crushers to be provided with hard metal coatings, for example tungsten carbide, for crushing ultrahigh purity silicon. Consequently the catalyst may already be present as tungsten carbide in the ultrahigh purity silicon dust generated as a byproduct. The addition of further amounts of catalyst may be avoided or at least minimized.

In a further embodiment the ultrahigh purity silicon has a Sauter mean diameter $d_{32}$ of 0.5 to 150 μm, preferably of 1 to 100 μm, more preferably of 5 to 80 μm, and in particular of 10 to 80 μm. The grain size is preferably 0.1 to 200 μm.

The ultrahigh purity silicon dust generated as a byproduct may optionally be subjected to a milling process and/or classification process (for example sieving, sifting) to obtain the desired particle size.

Determination of the grain size distribution/the Sauter mean diameter $d_{32}$ may be effected according to ISO 13320 (laser diffraction) and/or ISO 13322 (image analysis). Calculation of average particle sizes/diameters from particle size distributions may be performed according to DIN ISO 9276-2.

The process is preferably performed at a temperature of 280° C. to 400° C., more preferably 320° C. to 380° C., and most preferably 340° C. to 360° C. The temperature is the set temperature of the fluidized bed reactor. The set temperature is in principle specified as a target value by means of an adjustable temperature controller within a control loop and kept constant in the specified ranges by means of an appropriate cooling/heating system. Determination of the temperature may be effected for example by means of temperature sensors in the reactor interior (a plurality of temperature sensors and thus data points over the entire reactor height).

The process is preferably performed at an absolute pressure in the fluidized bed reactor of 0 to 0.5 MPa, more preferably 0.02 to 0.4 MPa, and most preferably 0.05 to 0.25 MPa.

During startup of the reactor, for example until formation of a stable fluidized bed, the values of pressure and temperature may differ from the values during the continuous reaction process. The same applies for the shutdown process.

In a further embodiment hydrogen chloride (HCl) and ultrahigh purity silicon are present in the fluidized bed reactor in a molar ratio of 10:1 to 3:1, preferably 7:1 to 3:1, more preferably 5:1 to 3:1, and in particular 3.9:1 to 3.1:1. Particularly during the reaction, HCl and the contact mass are continuously added such that the abovementioned ratio is established. Preheating of the contact mass and/or of HCl is not required in principle but may be appropriate in some cases.

It is preferable when the reaction gas contains at least 50% by volume, more preferably at least 70% by volume, and most preferably at least 90% by volume, of hydrogen chloride (HCl). In addition to HCl the reaction gas may further contain one or more components selected from the group comprising $H_2$, $H_nSiCl_{4-n}$ (n=0 to 4), $HmCl_{6-m}Si_2$ (m=0 to 6), $H_qCl_{6-q}Si_2O$ (q=0 to 4), $CH_4$, $C_2H_6$, CO, $CO_2$, $O_2$, $N_2$. These components may for example derive from HCl recovered in an integrated system. The reaction gas may further comprise a carrier gas, for example nitrogen or a noble gas such as argon. The reaction gas may further be admixed with hydrogen, in particular to influence the equilibrium position of the reaction. Hydrogen may also be present in recovered HCl as an impurity.

Determination of the composition of the reaction gas is typically effected via Raman and infrared spectroscopy and gas chromatography before supply to the reactor. This may be effected not only via samples withdrawn individually followed by off-line analyses but also via online analytical instruments integrated into the system.

It is preferable when the quotient of fill height to reactor diameter is 10:1 to 1:1, more preferably 8:1 to 2:1, and most preferably 6:1 to 3:1. The fill height essentially represents the center of mass of the fluidized bed and is dependent on the grain size distribution of the particles (fine particles tend to entail a large extent, and coarse particles a small extent, of the fluidized bed around the center of mass).

Chlorosilanes produced with the process according to the invention are preferably at least one chlorosilane selected from the group comprising monochlorosilane, dichlorosilane, trichlorosilane, $Si_2Cl_6$ and $HSi_2Cl_5$. It is particularly preferable when TCS is produced.

The process according to the invention is preferably incorporated in an integrated system for producing polycrystalline silicon. The integrated system in particular comprises the following processes:
  producing TCS by one of the processes according to the reactions (1), (2) and (3).
  Purifying the generated TCS to afford semiconductor-grade TCS.
  Depositing polycrystalline silicon, preferably by the Siemens process or as granulate.
  Further processing the generated polycrystalline silicon.
  Recycling the silicon dust generated in the production/further processing of the polycrystalline silicon by the process according to the invention.

FIG. 1 shows a fluidized bed reactor 1 for performing the process according to the invention. The reaction gas 2 is preferably injected into the particulate contact mass from below and optionally from the side (for example tangentially or orthogonally to the gas stream from below), thus fluidizing the particles of the contact mass to form a fluidized bed 3. The volume flow may be determined by a flow meter (for example rotameter) in the reaction gas feed conduit to the reactor. To start the reaction the fluidized bed 3 is generally heated by means of a heating apparatus arranged externally to the reactor (not shown). Heating is typically not required during continuous operation. A portion of the particles is transported with the gas flow out of the fluidized bed 3 into the empty space 4 above the fluidized bed 3. The empty space 4 is characterized by a very low solids density, said density decreasing in the direction of the reactor outlet. The proportion of particles exiting the reactor with the gas flow is described as particle discharge 5.

EXAMPLES

The examples were carried out in a fluidized bed reactor as described for example in U.S. Pat. No. 4092446.
General Procedure:
Nitrogen (carrier gas) was passed through the initially charged bed of contact mass until a fluidized layer was formed. The quotient of fluidized bed height to reactor diameter was set at a value of about 4. The reactor diameter was about 1 m. The fluidized bed was then heated to a temperature of 320° C. using an external heating apparatus. This temperature was kept constant over the entire experimental duration with the aid of a cooling means. Subsequently HCl was added and the contact mass replenished such that the height of the fluidized bed remained constant over the entire experimental duration and a constant molar ratio of the reactants (HCl:Si) of 3:1 was established. The pressure in the reactor was 0.1 MPa positive pressure over the entire experimental duration. After a running time of 48 h and 49 h both a liquid sample and a gas sample were withdrawn in each case. The condensable proportions of the product gas stream (chlorosilane gas stream) were condensed via a cold trap at −40° C. and analyzed by gas chromatography (GC) to determine TCS selectivity. Detection was via a thermal conductivity detector. The uncondensable proportion of the product gas stream was analyzed for unconverted HCl [% by volume] with an infrared spectrometer. The obtained values after 48 and 49 h were in each case used to form the average values. After each run the reactor was completely emptied and re-filled with contact mass.

Comparative Example 1

As the contact mass exclusively ultrahigh purity silicon particles (purity>99.9%, maximum particle size 200 μm, $d_{32}$=73 μm) were subjected to the above-described general procedure. Similarly to WO 2012/065892 A1, no formation of gaseous chlorosilanes was detected.

Comparative Example 2

As the contact mass exclusively a silicon powder composed of commercially available mgSi (Fe content: 1.4% by weight, Al content: 0.2% by weight, Ca content: 0.015% by weight, maximum particle size 200 μm, $d_{32}$=70 μm) was subjected to the above-described general procedure. As expected, conversion of the reactants to afford chlorosilanes took place. The amount of unconverted HCl was 7.5% by volume. TCS selectivity was 78%.

Working Example

As the contact mass ultrahigh purity silicon dust ($d_{32}$=68 μm) was subjected to the above-described general procedure, wherein the ultrahigh purity silicon dust contained as impurities as a consequence of manufacture (crushing of polycrystalline silicon) the following elements in the following proportions: Co: 10 ppmw, Mo: 5 ppmw, W: 72 ppmw, Zn: 154 ppmw, Ni: 35 ppmw, Cr: 79 ppmw. Surprisingly a conversion of the high-purity silicon to afford chlorosilanes took place under these conditions. The amount of unconverted HCl was 10.7% by volume. TCS selectivity was 81%.

The results show that according to the inventive process ultrahigh purity silicon may be converted directly by hydrochlorination in a fluidized bed reactor. The results achieved (HCl conversion and TCS selectivity) are comparable with the results obtained when using mgSi. The process according to the invention even makes it possible to achieve higher TCS selectivities.

The invention claimed is:
1. A process for producing chlorosilanes in a fluidized bed reactor comprising: reacting a hydrogen chloride-containing reaction gas with a particulate contact mass containing silicon and a catalyst, wherein the silicon consists of ultrahigh purity silicon having a purity>99.9%, wherein the catalyst comprises at least one element selected from the group consisting of Co, Mo and W, wherein the chlorosilanes have the general formula $H_nSiCl_{4-n}$ and/or $H_mCl_{6-m}Si_2$ where n=1-3 and m=0-4, and wherein the catalyst is present in the contact mass in a total amount of 100 to 400 ppmw, based on the weight of the contact mass, the catalyst content in ppmw calculated as the element.

2. The process of claim 1, wherein the catalyst further comprises at least one element selected from the group consisting of Zn, Cr and Ni.

3. The process of claim 1, wherein the catalyst is present in the contact mass in metallic, oxidic, carbidic, alloyed and/or salt form.

4. The process of claim 1, wherein the contact mass is a byproduct in the deposition of ultrahigh purity polycrystalline silicon and/or in the mechanical processing of ultrahigh purity polycrystalline/multicrystalline or single-crystal silicon.

5. The process of claim 4, wherein the catalyst is constituent of an abraded material from comminution equipment, plant parts and/or pipelines associated with the deposition or the mechanical processing of the ultrahigh purity silicon.

6. The process of claim 1, wherein the ultrahigh purity silicon has a Sauter mean diameter $d_{32}$ of 0.5 to 150 μm.

7. The process of claim 1, wherein the ultrahigh purity silicon has a Sauter mean diameter $d_{32}$ of 1 to 100 μm.

8. The process of claim 1, wherein the ultrahigh purity silicon has a Sauter mean diameter $d_{32}$ of 5 to 80 μm.

9. The process of claim 1, wherein the process is performed at a temperature of 280° C. to 400° C.

10. The process of claim 1, wherein the process is performed at an absolute pressure in the fluidized bed reactor of 0 to 0.5 MPa.

11. The process of claim 1, wherein the hydrogen chloride and the ultrahigh purity silicon are present in a molar ratio of 10:1 to 3:1.

12. The process of claim 1, wherein the hydrogen chloride and the ultrahigh purity silicon are present in a molar ratio of 7:1 to 3:1.

13. The process of claim 1, wherein the reaction gas contains at least 50% by volume of hydrogen chloride.

14. The process of claim 1, wherein the reaction gas contains at least 70% by volume of hydrogen chloride.

15. The process of claim 1, wherein the ratio of fill height to reactor diameter is 10:1 to 1:1.

16. The process of claim 1, wherein at least one the chlorosilane is selected from the group consisting of monochlorosilane, dichlorosilane, trichlorosilane, $Si_2C_6$, and $HSi_2Cl_5$.

17. The process of claim 1, which is incorporated into an integrated system for producing polycrystalline silicon.

18. The process of claim 1, wherein one or more of Co, Mo, and W is/are present in the form of a carbide or chloride.

19. The process of claim 1, wherein the catalyst contains Mo and/or W.

* * * * *